(12) United States Patent
Cho et al.

(10) Patent No.: US 6,965,587 B2
(45) Date of Patent: Nov. 15, 2005

(54) METHOD FOR OPERATING CDMA CHANNEL IN BASE TRANSCEIVER STATION

(75) Inventors: Kye Chol Cho, Ichon (KR); Dae Goo Kang, Ichon (KR); Sang Sung Kim, Ichon (KR)

(73) Assignee: UTStarcom, Inc., Alameda, CA (US)

( * ) Notice: Subject to any disclaimer, the term of this patent is extended or adjusted under 35 U.S.C. 154(b) by 801 days.

(21) Appl. No.: 09/798,553

(22) Filed: Mar. 2, 2001

(65) Prior Publication Data

US 2001/0048674 A1    Dec. 6, 2001

(30) Foreign Application Priority Data

May 9, 2000   (KR)   ................ 2000-24684

(51) Int. Cl.[7] .......................................... H04B 7/216
(52) U.S. Cl. ...................... 370/335; 370/338; 370/342; 455/450; 455/67.11
(58) Field of Search .............................. 370/335, 342, 370/338, 331; 455/67.1, 436–438, 442, 450, 455/67.11; 375/140

(56) References Cited

U.S. PATENT DOCUMENTS

| | | | |
|---|---|---|---|
| 5,507,007 A | * | 4/1996 | Gunmar et al. ............. 455/447 |
| 5,511,067 A | | 4/1996 | Miller ......................... 370/18 |
| 5,606,727 A | | 2/1997 | Ueda .......................... 455/34.1 |
| 5,859,854 A | | 1/1999 | Reudink ...................... 370/480 |
| 6,064,663 A | | 5/2000 | Honkasalo et al. ......... 370/335 |
| 6,141,546 A | * | 10/2000 | Thomas et al. ............. 455/424 |
| 6,212,388 B1 | * | 4/2001 | Seo ............................. 455/450 |
| 6,381,235 B1 | * | 4/2002 | Kamel et al. ............... 370/342 |

* cited by examiner

*Primary Examiner*—Ricky Ngo
*Assistant Examiner*—Nittaya Juntima
(74) *Attorney, Agent, or Firm*—McDonnell Boehnen Hulbert & Berghoff LLP

(57) ABSTRACT

Disclosed is a method for operating a CDMA channel in a base transceiver station (BTS). The method for operating the CDMA channel in the BTS includes variably generating a CDMA channel list message transmitted from the BTS to a mobile station (MS) in a CDMA mobile communication system according to the BTS and a frequency allocation (FA) within the BTS, so as to variably operate the CDMA channel by the BTS and the FA. The method according to an embodiment of the present invention also includes variably allocating a CDMA frequency number group by the BTS and the FA in accordance with a CDMA channel index, a CDMA channel ID, and a CDMA channel kind, so that the CDMA channel is operated between BTSs and further by the FA, independently, thereby optimizing the CDMA frequency operation between the BTS and the MS.

8 Claims, 7 Drawing Sheets

FIG. 2

| Item | Description | Other |
|---|---|---|
| Tuple_Status | Tuple Status | Key Value of CDMA Channel Index List DB |
| CDMA_Channel_Index | CDMA Channel Index Value | Defined in CDMA Channel Id List DB |
| CDMA_Channel_Id | CDMA Channel Id Value | |
| CDMA_Channel_Kind | CDMA Channel Kind Common_Service, Having Test_service Value | |
| Other Information | | |

FIG. 3

| Item | Description | Other |
|---|---|---|
| Tuple_Status | Tuple Status | |
| CDMA_Channel_Id | CDMA Channel Id Value | Key Value of CDMA Channel Index List DB |
| CDMA_Channel_Number | FDMA Channel Frequency Number | |
| Other Information | | |

FIG. 4

| Item | Description | Length |
| --- | --- | --- |
| Message Type('00000100') | Message Type | 8 |
| Pilot PN | Pilot PN sequence offset index | 9 |
| Config_Msg_Seq | Congifuration message sequence number | 6 |
| CDMA Freq | CDMA Channel frequency number | 11 |
| ...... | | |
| Reserved | | 0-7 |

FIG. 6a

Example

| CDMA Channel Id List DB | | | | | | | | |
|---|---|---|---|---|---|---|---|---|
| CDMA Channel Id | 0 | 1 | 2 | 3 | 4 | 5 | 6 | 7 |
| CDMA Channel Number | 100 | 200 | 300 | 400 | 500 | 600 | 700 | 800 |

FIG. 6b

Base Transceiver Station A

| CDMA Channel Index List DB | | | | |
|---|---|---|---|---|
| CDMA Channel Index | 0 | 1 | 2 | 3 |
| CDMA Channel Id | 0 | 1 | 2 | 3 |

FIG. 6c

Base Transceiver Station B

| CDMA Channel Index List DB | | | | |
|---|---|---|---|---|
| CDMA Channel Index | 0 | 1 | 2 | 3 |
| CDMA Channel Id | 3 | 4 | 5 | 6 |

FIG. 7a

Base Transceiver Station A

| CDMA Channel List Message | | | | |
|---|---|---|---|---|
| FA | 0 | 1 | 2 | 3 |
| CDMA Freq | 100 | 100 | 100 | 100 |
| CDMA Freq | 200 | 200 | 200 | 200 |
| CDMA Freq | 300 | 300 | 300 | 300 |
| CDMA Freq | 400 | 400 | 400 | 400 |

FIG. 7b

Base Transceiver Station B

| CDMA Channel List Message | | | | |
|---|---|---|---|---|
| FA | 0 | 1 | 2 | 3 |
| CDMA Freq | 400 | 400 | 400 | 400 |
| CDMA Freq | 500 | 500 | 500 | 500 |
| CDMA Freq | 600 | 600 | 600 | 600 |
| CDMA Freq | 700 | 700 | 700 | 700 |

FIG. 8a

Example

| CDMA Channel Id List DB | | | | | | | | |
|---|---|---|---|---|---|---|---|---|
| CDMA Channel Id | 0 | 1 | 2 | 3 | 4 | 5 | 6 | 7 |
| CDMA Channel Number | 100 | 200 | 300 | 400 | 500 | 600 | 700 | 800 |

FIG. 8b

Base Transceiver Station A

| CDMA Channel Index List DB | | | | |
|---|---|---|---|---|
| CDMA Channel Index | 0 | 1 | 2 | 3 |
| CDMA Channel Id | 0 | 1 | 2 | 3 |
| CDMA Channel Kind | Common_service | Test_service | Common_service | Test_service |

FIG. 8c

Base Transceiver Station A

| CDMA Channel List Message | | | | |
|---|---|---|---|---|
| FA | 0 | 1 | 2 | 3 |
| CDMA Freq | 100 | 200 | 100 | 200 |
| CDMA Freq | 300 | 400 | 300 | 400 |

METHOD FOR OPERATING CDMA CHANNEL IN BASE TRANSCEIVER STATION

BACKGROUND OF THE INVENTION

1. Field of the Invention

The present invention generally relates to a method for operating a code division multiple access (CDMA) channel in a base transceiver station for a mobile communication system, i.e., Digital Communications System (DCS), Personal Communication Service (PCS), Wireless Local Loop (WLL), employing a CDMA technology, and more particularly, to a method for operating a CDMA channel in a base transceiver station for a mobile communication system by a base transceiver station and a frequency allocation (FA) by using a CDMA channel index, a CDMA channel identification (ID), and a CDMA channel kind, thereby optimizing a frequency operation of the CDMA system without a mobile communication service suspension.

2. Description of the Related Art

A CDMA channel index, which is a sort of CDMA channel identifier, has a CDMA channel ID and a CDMA channel kind as the independent information by a base transceiver system. The CDMA channel ID, which is a sort of an identifier for identifying each unique CDMA channel, has a frequency number of its own. The channel kind, which determines what a pertinent frequency is used for, has a common_service and a test_service. The common_service is used as a frequency for common users, while the test_service is used as a test frequency for a system inspection.

A CDMA channel list message, directed from a base transceiver station to a mobile station in a DCS, a PCS, a WLL system or the like employing the CDMA technology, notifies the mobile station of a frequency number (e.g., channel) available on the base transceiver station.

The mobile station, upon receipt of the CDMA channel list message, determines a predetermined frequency through a hash function based on a frequency list in the pretinent message and converts the predetermined frequency into a pertinent frequency so as for the same to be waited.

The conventional method for generating the CDMA channel list message which has frequency availability information in the mobile communication system is characterized in the CDMA channel list message having common contents between base transceiver stations and being generated to be transmitted to the mobile station. Further the CDMA channel list message having common contents between frequency allocations (FA), is also generated within the base transceiver station used in a multi FA operation manner.

In the CDMA channel operation according to the conventional art, the same CDMA channel list message is generated between the base transceiver stations and also between the FAs within the base transceiver stations. Thus, if a test is to be carried out with respect to a CDMA channel of one base transceiver station, the base transceiver station must stop the mobile communication service so as to be tested.

In addition, if a test is carried out with respect to one FA within the base transceiver station, a subscriber of the mobile communication system within the FA service area can not be provided with the mobile communication service by means of only the FA.

Further, the conventional operation of the CDMA channel, as stated above, is equally performed in inter-base transceiver stations and in inter-FAs within the base transceiver stations, thereby impeding the flexibility thereof in the CDMA system.

SUMMARY OF THE INVENTION

It is, therefore, an object of the present invention to provide a method for operating a CDMA channel in a base transceiver station by generating and operating a CDMA channel list message by a base transceiver station and a FA by means of a CDMA channel index, and a CDMA channel identification and a CDMA channel kind, thereby optimizing a CDMA frequency operation between the base transceiver station and the mobile station.

BRIEF DESCRIPTION OF THE DRAWINGS

The above and other objects, features and advantages of the present invention will become more apparent from the following detailed description when taken in conjunction with the accompanying drawings, in which:

FIG. 2 is a table illustrating a configuration of a CDMA channel index database (DB) according to the present invention;

FIG. 3 is a table illustrating a configuration of a CDMA channel identification (ID) DB according to the present invention;

FIG. 4 is a table illustrating a configuration of a CDMA channel list message according to the present invention;

FIG. 6a is a table illustrating a configuration of a CDMA channel ID list DB, which is a common information between base transceiver stations;

FIG. 6b is a table illustrating a configuration of a CDMA channel index list DB of a base transceiver station A;

FIG. 6c is a table illustrating a configuration of a CDMA channel index list DB of a base transceiver station B;

FIG. 7a and FIG. 7b are tables illustrating a process of allocating a CDMA frequency number, so that the CDMA channel operation between base transceiver stations can be variably performed;

FIG. 8a is a table illustrating a configuration of a CDMA channel ID list DB, which is a common information between base transceiver stations;

FIG. 8b is a table illustrating a configuration of a CDMA channel index list DB of the base transceiver station A including a CDMA channel kind; and FIG. 8c is a table illustrating a process of variably allocating a CDMA frequency number by the FA within the base transceiver station A.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

Figure 1:
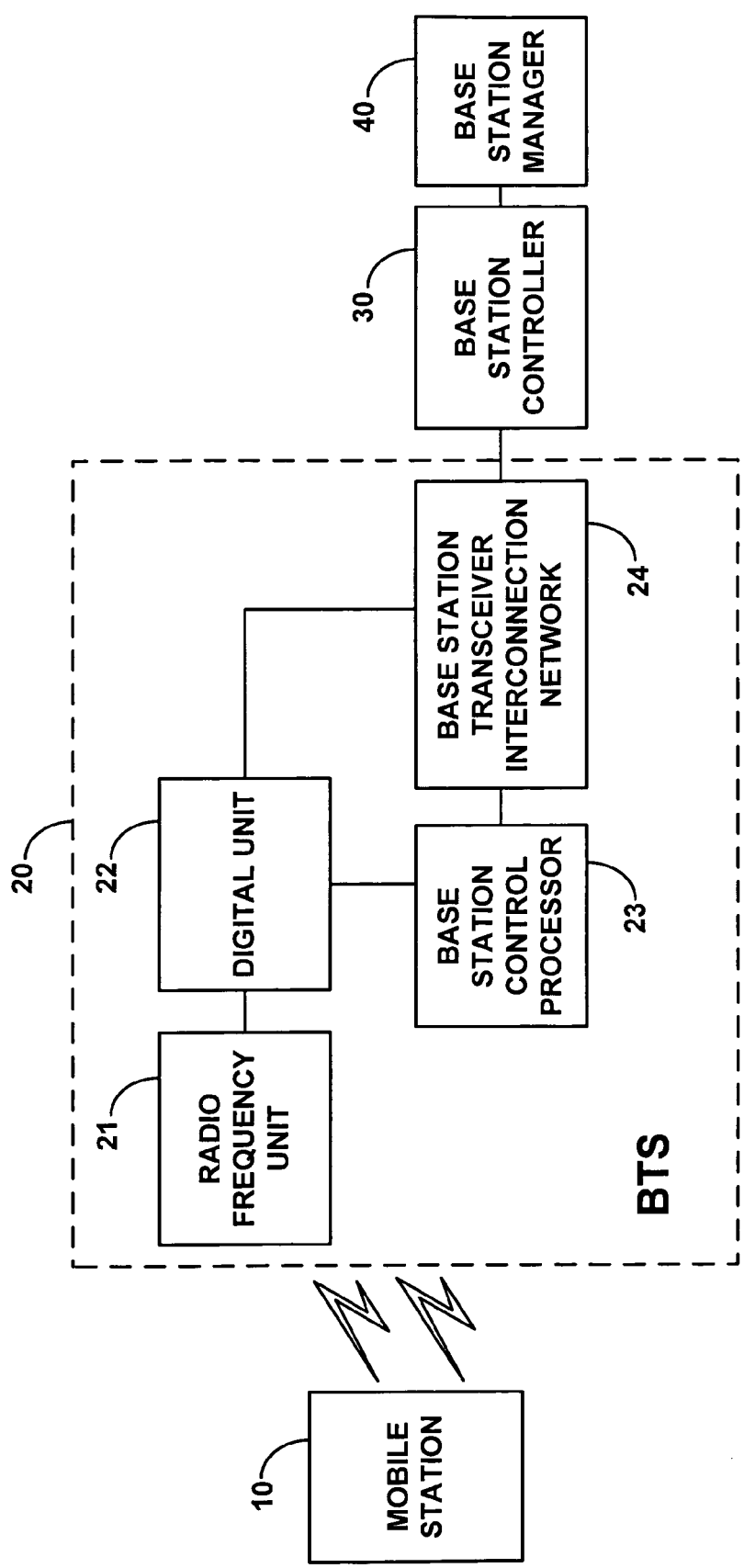
FIG. 1 is a block diagram illustrating a CDMA mobile communication system according to the present invention.

FIG. 1 is a block diagram illustrating a CDMA mobile communication system according to the present invention.

A base station manager (BSM) 40 controls a base station controller 30 and a base transceiver station 20 upon receipt of a demand by an operator. The base station controller (BSC) 30 processes a call request generated from the base transceiver station (BTS) 20 to control the BTS 20. The BTS 20 incorporates a CDMA channel information available to a mobile station in a CDMA channel list message to transmit the same through a radio interface to the mobile station 10, from which the signal is further transmitted to the BSC 30. The mobile station (MS) 10 selects a CDMA channel to operate a radio interface with the BTS after receiving the CDMA channel list message from the BTS, and then requests the BTS for a mobile communication service.

The BTS 20 comprises a radio frequency unit (RFU) 21 for processing a radio frequency (RF) to operate a radio interface with the MS 10; a digital unit (DU) 22 for demodulating each channel signal and correcting errors in each channel signal received from the RFU 21 to transmit the same to the BSC, and digitizing a coded data packet received from the BSC 30 to be available to each CDMA channel to transmit the same to the RFU 21; a base station control processor (BCP) 23 for controlling an overall operation of the BTS and controlling the CDMA channel by a frequency allocation (FA); and a BTS interconnection network (BIN) 24 for connecting the DU 22 and the BCP 23 to the BSC 30.

The BTS 20 generates the CDMA channel list message by using a CDMA channel index, a CDMA channel ID, and a CDMA channel kind. The BTS 20 includes a CDMA channel index list database (DB) and a CDMA channel ID DB in order to maintain values of the CDMA channel index, the CDMA channel ID and the CDMA channel kind.

To be specific, each BTS 20 has an information concerning its CDMA channel index list DB. Each CDMA channel index DB includes a CDMA channel index, a CDMA channel ID and a CDMA channel kind, as shown in FIG. 2.

Besides, the BTS 20 has a CDMA channel ID list DB information, namely, a common information therebetween. FIG. 3 is a table illustrating a configuration of the CDMA channel ID DB. The CDMA channel ID DB includes a CDMA ID and a CDMA channel number for representing a real frequency band.

FIG. 4 is a table illustrating a standard for the CDMA channel list message according to the present invention.

The CDMA channel list message includes a message type, and a CDMA frequency number. Here, a different CDMA frequency number is allocated based on the CDMA frequency band in order to operate the CDMA channel by the BTS and the FA on a different basis.

Initially, it will be described a method for variably operating the CDMA channel between BTSs by independently generating the CDMA channel list message by the BTSs.

The BTS variably transmits the frequency number of the CDMA channel list message to the MS by the BTS by separately managing the CDMA channel index and the CDMA channel ID.

A method for variably operating the CDMA channel between BTSs according to an embodiment of the present invention comprises the steps of setting the CDMA channel ID list DB, which is a common information source between the BTSs, and the CDMA channel index list DB by the BTSs; and searching, in each BTS, the CDMA channel ID of the CDMA channel index in the CDMA channel index list DB, and searching the CDMA channel number of the CDMA channel ID in the CDMA channel ID list DB to generate each different CDMA channel list message by each BTS.

The method for variably operating the CDMA channel between BTSs will be described herein below in detail.

FIG. 6a is a table illustrating the CDMA channel ID list DB, which is a common information between the respective BTSs. The CDMA channel number corresponding to the CDMA channel ID 0 is 100; CDMA channel ID 1, 200; CDMA channel ID 2, 300; CDMA channel ID 4, 500; CDMA channel ID 5, 600; CDMA channel ID 6, 700; and CDMA channel ID 7, 800.

FIG. 6b is a table illustrating the CDMA channel index list DB of the BTS A. The CDMA channel index of the BTS A has the CDMA channel ID, respectively. FIG. 6c is a table illustrating the CDMA channel index list DB of the BTS B. The CDMA channel index list DB of the BTS B has the CDMA channel ID, respectively. Here, the CDMA channel IDs of the BTS A and of the BTS B are separately set such that the CDMA channel between the BTS A and B is independently operable. The CDMA channel ID of the CDMA channel index list DB in each BTS is set to be a program loaded data (PLD) as an initial value of the database (DB) through a base station manager by an operator. That is to say, the CDMA channel ID of the CDMA channel index list DB in the BTS A is altered by conveying an alteration command from the BSM to the BCP of the BTS.

If the DB is configured as shown in FIG. 6a FIG. 6b and FIG. 6c (information only necessary for description listed), the CDMA channel list message of the BTS A by each FA is generated as illustrated in FIG. 7a while the CDMA channel list message of the BTS B by each FA is generated as illustrated in FIG. 7b.

More specifically, in case of the BTS A, four FAs (0FA, 1FA, 2FA, and 3FA) search the CDMA channel ID by independently referring to the CDMA channel index list DB. The CDMA channel ID of the BTS A is resulted in 0, 1, 2 and 3, and therefore the FAs search the CDMA channel number 100, 200, 300 and 400 in the CDMA channel ID list DB of FIG. 6a to allocate the same to the CDMA frequency number of the CDMA channel list message.

The same way as in the case of BTS A is used in case of the BTS B. FAs search the CDMA channel number in the CDMA channel ID list DB of FIG. 6a. The resultant channel number is 400, 500, 600 and 700, which are allocated to the CDMA frequency number of the BTS B as shown in FIG. 7b.

The CDMA channel list messages are generated to have different CDMA frequency numbers by the BTS A and B, whereby the CDMA channels in the BTS A and B are independently operated from each other. Therefore, a high-quality communication service can be provided for the mobile communication system subscriber, since the frequencies available to the neighboring BTSs are different, respectively, and thus an interference therewith is minimized.

Next, it will be described a method for variably operating the CDMA channel by the FA by independently generating the CDMA channel list message by the FA within the BTS of the present invention.

Figure 5:
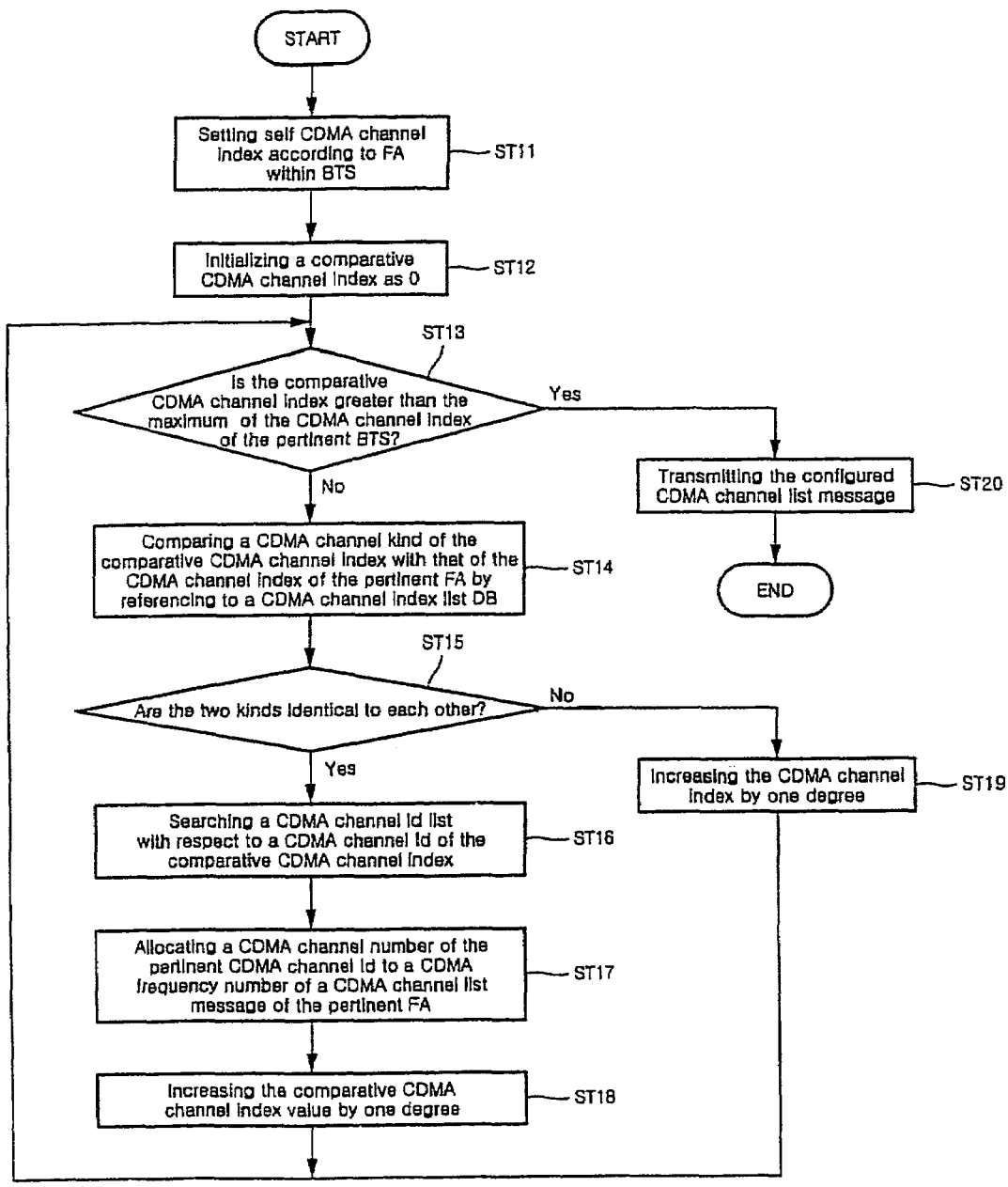
FIG. 5 is a flow chart illustrating a process of variably operating a CDMA channel by a frequency allocation (FA) within a base transceiver station according to the present invention.

FIG. 5 is a flow chart illustrating a process of variably operating the CDMA channel by the FA within the BTS of the present invention.

As drawn in FIG. 5, the method for variably operating the CDMA channel according to the FA within the BTS comprises an initialization step of setting the CDMA channel index by each FA within the pertinent BTS and initializing a comparative CDMA channel index (ST11, ST12); and a CDMA channel variable operation step of searching the comparative CDMA channel index having the same CDMA channel kind as the CDMA channel index by each FA and allocating the CDMA channel number of the comparative CDMA channel index to the same to generate the CDMA channel list message by the FA (ST13~ST20), independently.

The CDMA channel variable operation step (ST13–ST20) comprises a first step of comparing the comparative CDMA channel index and the maximum of the CDMA channel index of the BTS for the transmittance of the configured CDMA channel list message if the comparative CDMA channel index is greater, or comparing the CDMA channel kind of the comparative CDMA channel index and that of the CDMA channel index of the pertinent FA by referring to the CDMA channel index list DB if the comparative CDMA channel index is not greater (ST13, ST14); a second step of increasing the comparative CDMA channel index by one degree to proceed to the first step if the CDMA channel kinds of the comparative CDMA channel index and the CDMA channel index of the pertinent FA are not identical (ST15, ST19); and a third step of searching the CDMA channel ID list DB by means of the CDMA channel ID of the comparative CDMA channel index, allocating the CDMA channel number of the CDMA channel ID to the CDMA frequency number of the CDMA channel list message of the pertinent FA, and increasing the comparative CDMA channel index by one degree to proceed to the first step, if the CDMA channel kinds of the comparative CDMA channel index and the CDMA channel of the pertinent FA are identical (ST15–ST18).

The method for variably operating the CDMA channel by the FA within the BTS according to the present invention will be described herein below in detail.

An information concerning the CDMA channel kind is added to each CDMA channel index comprised in each BTS. When the CDMA channel list message is transmitted from the BTS to the MS, the CDMA channel number is grouped by the FA, and the CDMA channel list message is accordingly generated, thereby variably operating the CDMA channel by the FA within the BTS.

The CDMA channel number by the FA within the BTS is grouped by allocating the frequency number of the CDMA channel index having the same the CDMA channel kind as the CDMA channel index of the pertinent FA to the CDMA frequency item of the CDMA channel list message.

The CDMA channel kind is divided into two kinds, that is, a common_service and a test_service. The common_service is used with a frequency for common users and the test_service is used with a test frequency for a system inspection.

The method for variably operating the CDMA channel by the FA within the BTS will be described herein below in detail with reference to FIG. 8a, FIG. 8b and FIG. 8c.

Referring to FIG. 8a, the CDMA channel ID list DB is set as a common information between the BTSs, whereas referring to FIG. 8b, the CDMA channel index list DB of the BTS A is set to add the CDMA channel kind thereto.

Then, the CDMA channel index is set by each FA within the BTS A (ST11). To be specific, the 0FA has its CDMA channel index 1, the 1FA has its CDMA channel index 2 and the 2FA has its CDMA channel index 3. The comparative CDMA channel index is initialized 0 (ST12).

The comparative CDMA channel index and the maximum of the CDMA channel index of the BTS A are compared with each other. If the comparative CDMA channel index value is not greater than the CDMA channel index of the BTS A, the CDMA channel kind of the comparative CDMA channel index and that of the CDMA channel index of the pertinent FA are compared by referring to the CDMA channel index list DB in FIG. 8b (ST13 and ST14).

In case of the 0FA where the CDMA channel kind of the CDMA channel index is the common_service, the CDMA channel index having the same CDMA channel kind as the comparative CDMA channel index is searched. Since the CDMA channel kind of the CDMA channel index of the pertinent FA is identical to that of the comparative CDMA channel index 0 (ST15), the CDMA channel ID list DB is searched by means of the CDMA channel ID of the comparative CDMA channel index (ST16).

As a result of the search, the CDMA channel number corresponding to the CDMA channel ID is 100, which is allocated to the CDMA frequency number of the 0FA (ST17). After that, the comparative CDMA channel index is increased by one degree to proceed to the ST13 (ST18).

The comparative CDMA channel index 1 and the maximum of the CDMA channel index are compared (ST13). If the comparative CDMA channel index is not greater than the maximum of the CDMA channel index, the ST14 is proceeded with. Since the CDMA channel kind of the comparative CDMA channel index is not identical to that of the CDMA channel index of the pertinent FA (ST15), the comparative CDMA channel index is increased by one degree to proceed to ST13 (ST19).

After re-comparing the two values, since the comparative CDMA channel index 2 is not greater than the maximum value of the CDMA channel index of the BTS A (ST13), ST14 is proceeded with. Since the CDMA channel kind of the comparative CDMA channel index 2 is the common_service, and identical to that of the CDMA channel index of the BTS A (ST15) after the comparison in ST14, the search is performed in the DB of the FIG. 8a with the CDMA channel ID 2 of the comparative CDMA channel index 2 as a key. The CDMA channel number 300 of the CDMA channel ID 2 is searched to be allocated to the CDMA frequency number of the 0FA (ST16 and ST17).

Then, the comparative CDMA channel index is increased by one degree to proceed to ST13 (ST18).

If the comparative CDMA channel index is greater than the maximum of the CDMA channel index of the BTS A, the allocated CDMA frequency number is recorded in a pertinent area of the CDMA channel list message, which is then transmitted to the MS (ST20).

While the CDMA frequency number of the CDMA channel list message is grouped with respect to the 0FA, the CDMA frequency number is also grouped with respect to the 1FA, 2FA and 3FA as drawn in FIG. 8c.

Thereafter, the CDMA channel list message differently generated by the FA is transmitted to each MS, so that the MS within the 0FA and the 2FA operable areas can use the frequency resources of 100 and 300 for the mobile communication service, while the mobile communication system operator can test the system by using the frequency resources of 200 and 400 in the 1FA and 3FA operable areas. The CDMA channel is variably operable by the FA within the BTS A, whereby the mobile communication service and the system performance test are simultaneously performed.

As stated above, the method for operating the CDMA channel in the BTS according to the present invention has an advantage of variably operating the CDMA channel by generating the CDMA channel list message by the BTS and the FA, independently, by means of the CDMA channel index, the CDMA channel ID, and the CDMA channel kind.

The method for operating the CDMA channel in the BTS according to the present invention has another advantage of optimizing the CDMA frequency operation between the BTS and the MS by operating different CDMA channels between the BTSs and further by the FAs.

The method for operating the CDMA channel in the BTS according to the present invention has further another advantage of using the frequency of the DCS, PCS, or WLL system employing the CDMA technology for various purposes and optimizing the air cell environment between the BTS and the MS by differently operating the CDMA channel list message between the BTS and the MS by the BTS and the frequency.

The method for operating the CDMA channel in the BTS according to the present invention has still another advantage of minimizing the interference and providing a high-quality mobile communication service for the system subscribers by operating the CDMA channel by the BTS and the FA.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for operating a code division multiple access (CDMA) channel in a CDMA communication system, wherein the CDMA system comprises a plurality of base transceiver stations (BTSs), the method comprising the steps of:
    creating (i) a CDMA channel identification (ID) list database (DB), which is a common information source between said plurality of BTSs, and (ii) a CDMA channel index DB for at least one BTS of the plurality of BTSs; and
    searching for, in the at least one BTS of the plurality, a CDMA channel ID of a CDMA channel index in the CDMA channel index DB, and searching for a CDMA channel number of said searched CDMA channel ID in said CDMA channel ID list DB to variably generate different CDMA channel list messages independently.

2. The method of claim 1, wherein said CDMA channel ID list DB includes a CDMA channel ID for uniquely identifying a CDMA channel and a CDMA channel number for representing a real frequency band.

3. The method of claim 1, wherein said CDMA channel index DB comprises a CDMA channel index, which is a CDMA channel identifier, a CDMA channel ID for uniquely identifying said CDMA channel and a CDMA channel kind for representing usage thereof.

4. The method of claim 3, wherein said CDMA channel kind is one of a common_service channel, which is used as a frequency for common users; and a test_service channel, which is used as a test frequency for system inspection.

5. A method for operating a CDMA channel between a given base transceiver station (BTS) and a mobile station (MS) in a CDMA system, the method comprising the steps of:

(a) creating a CDMA channel index in a given frequency allocation (FA) of one or more FAs within the given BTS of the CDMA system and initializing a comparative CDMA channel index; and (b) searching, in each of the one or more FAs, said comparative CDMA channel index having the same CDMA channel kind as its own CDMA channel kind by referring to a CDMA channel index list database (DB), and allocating a CDMA channel number corresponding to said comparative CDMA channel index to generate a CDMA channel list message for the given FA, independently.

6. The method of claim 5, wherein said step (b) comprises the steps of:

(i) comparing said comparative CDMA channel index with a maximum CDMA channel index of said given BTS and transmitting said CDMA channel list message if said comparative CDMA channel index is greater than a maximum of said CDMA channel index of said given BTS, or comparing a CDMA channel kind of said comparative CDMA channel index with that of said CDMA channel index of said given FA by referring to said CDMA channel index DB if said comparative CDMA channel index is not greater than said CDMA channel index of said given BTS;

(ii) increasing a value of said comparative CDMA channel index and returning to said step (i) if said CDMA channel kinds of said comparative CDMA channel index and CDMA channel index of said given FA are not identical to each other; and (iii) searching a CDMA channel ID list DB for a CDMA channel ID of said comparative CDMA channel index, allocating a CDMA channel number of said CDMA channel ID to a CDMA frequency number of said CDMA channel list message of said given FA, increasing the value of said comparative CDMA channel index and returning to said step (i) if said CDMA channel kinds of said comparative CDMA channel index and CDMA channel index of said pertinent FA are identical to each other.

7. The method of the claim 5, wherein said CDMA channel index list DB includes a CDMA channel index, which is a CDMA channel identifier, a CDMA channel ID for uniquely identifying said CDMA channel and a CDMA channel kind for representing usage thereof.

8. The method of claim 7, wherein said CDMA channel kind is one of common_service channel, which is used as a frequency for common users; and the other being a test_service channel, which is used as a test frequency for system inspection.

* * * * *